United States Patent [19]

Shen-Orr et al.

[11] Patent Number: 4,638,250
[45] Date of Patent: Jan. 20, 1987

[54] CONTACTLESS POSITION SENSOR WITH CORELESS COIL COUPLING COMPONENT

[75] Inventors: Chaim D. Shen-Orr; Eitan Berg, both of Haifa, Israel

[73] Assignee: Fiscint, Inc., Boston, Mass.

[21] Appl. No.: 574,974

[22] Filed: Jan. 30, 1984

[51] Int. Cl.⁴ .................. G01B 7/14; G08C 19/06
[52] U.S. Cl. ............................ 324/207; 324/208; 336/115; 340/870.32
[58] Field of Search ............... 324/207, 208, 239; 340/870.31–870.36, 551, 572; 318/652, 653, 656–661; 336/115, 117–120, 122–126, 129

[56] References Cited

U.S. PATENT DOCUMENTS

| | | | |
|---|---|---|---|
| 2,436,639 | 2/1948 | Faus | 340/870.32 X |
| 2,852,733 | 9/1958 | Sorkin | |
| 2,976,495 | 3/1961 | Unger | |
| 3,090,933 | 5/1963 | Henry-Baudot | |
| 3,173,119 | 3/1965 | Thompson | |
| 3,456,132 | 7/1969 | Dechelotte | 324/208 X |
| 3,699,558 | 10/1972 | Hendley et al. | |
| 3,758,845 | 9/1973 | MacKelvie et al. | 340/870.32 |
| 3,827,291 | 8/1974 | McCalvey | 324/208 X |
| 4,013,911 | 3/1977 | Fujiwara et al. | 324/208 X |
| 4,119,908 | 10/1978 | Cosman et al. | 340/551 X |
| 4,215,342 | 7/1980 | Horowitz | 340/572 |
| 4,381,506 | 4/1983 | Linn et al. | 324/208 X |
| 4,406,999 | 9/1983 | Ward | 324/208 X |

FOREIGN PATENT DOCUMENTS

| | | | |
|---|---|---|---|
| 1047289 | 10/1954 | Fed. Rep. of Germany | 324/208 |
| 0898258 | 1/1982 | U.S.S.R. | 324/207 |

*Primary Examiner*—Gerard R. Strecker
*Attorney, Agent, or Firm*—Sandler & Greenblum

[57] ABSTRACT

A position sensor device is provided which inductively measures the change in position of a shorted conductive loop coil that is oriented to move in conjunction with the machine part to be measured relative to a stationary assembly. The stationary assembly is made up of a magnetic field generator and a sensor, which are oriented to respectively create and receive the magnetic field which is coupled to the loop. As a result, displacement of the coupling coil varies the degree of coupling between the generator and sensor such that the magnitude of the induced electrical current is representative of the location of the loop relative to the stationary assembly. The device can be used for measuring angular rotation, linear position and the angle of rotation, and linear movement with respect to displacement from a predetermined null position.

28 Claims, 4 Drawing Figures

CONTACTLESS POSITION SENSOR WITH CORELESS COIL COUPLING COMPONENT

DESCRIPTION

1. Technical Field

This invention relates to a contactless position sensor which measures the position or displacement of a movable member relative to a stationary assembly.

2. Background Art

Electrical measuring sensors, often employ contacts, such as brushes, slip rings, wire conductors, or the like, to indicate the position of a movable member. The elimination of contacts is desirable as it provides relative freedom from electrical noise and disturbances caused by sliding electric contact. As a consequence, contactless position sensors have been developed which measure variations in induced magnetic flux.

Hendley et al., U.S. Pat. No. 3,699,558, for example, discloses an angular position sensor which detects the distortion of a magnetic field produced by the rotation of a compass. The sensor comprises a transmitter coil, inductive sensor coils in opposed relation to the transmitter, and a circular, rotatable short-circuited screen disposed in an air gap between the transmitter and the sensors. The screen is composed of an insulating material having a conductive grid etched along the face opposite the transmitter and, as a result, screens or distorts the magnetic flux thereby modifying the coupling of the transmitter to the oppositely disposed sensor coils. Angular position, therefore, can be determined by reading an ammeter or voltmeter.

However, the disposition, stability and, therefore, overall positional accuracy of the screen is paramount as minor disturbances reduce the accuracy of the reading. Centrifugal vibration, resulting from rotating the screen, for example, would result in temporary alterations in the magnetic flux between sensor coils and the screen. Furthermore, the location of the screen between coils makes control of vibration and other disturbances difficult as the screen cannot be easily held in a firm position without obstructing or distorting the magnetic fluxes. Similar designs having this arrangement are illustrated in U.S. Pat. No. 3,090,933; U.S. Pat. No. 2,852,733; and U.S. Pat. No. 2,976,495.

Designs in which the movable member is placed above the transmitter and sensor coils are disclosed in U.S. Pat. No. 4,013,911 and U.S. Pat. No. 3,173,119. The former patent to Fujiwara, discloses a displacement transducer having a rotating semi-circular magnetic core disposed above one or more stationary secondary coils. The latter patent to Thompson, discloses a linearly movable core which is disposed over a three-legged core having a shortened middle leg. A primary winding is wound around the center leg and secondary windings around the outer legs. An air gap exists between a movable element located at the midpoint of a core member attached to the outer legs such that when a magnetic flux is generated, it is displaced by the movable element in two directions wherein the secondary windings, which are connected in opposed series, produce an alternating current signal indicative of the displacement of the movable element from a null position.

While Fujiwara and Thompson show simpler structures, the movable member is connected to the same cores as the first and second windings. As a result, reluctance and inaccurate division of the flux paths can occur. Therefore, none of the above-described devices provide positional measurements wherein coupling between the primary and secondary windings is controlled solely by a movable member which can move in either a rotational or linear manner, is not overly sensitive to vibration, and is not mechanically connected to the windings. Furthermore, none of these references disclose coupling the primary and secondary windings but mutual inductance which would avoid the drawbacks of mechanically coupled arrangements and provide an apparatus not overly sensitive to distortions in magnetic flux produced by unexpected vibration. Finally, none of the prior art discloses a position sensor in which the degree of coupling between the moving part and either the primary or secondary winding is constant and independent of the movement of the moving part.

Thus, despite the past use of variable inductive transducers for positional measurement, no design which employs a movable and a stationary assembly for providing highly accurate measurements by means of mutual inductance is currently available. It is, therefore, an object of the present invention to provide a new and improved variable inductive measuring device wherein the above-described deficiencies are overcome or substantially reduced.

DISCLOSURE OF INVENTION

This invention provides for a contactless position sensor comprising a magnetic field generator component and a magnetic field sensor component which are magnetically coupled by means of mutual inductance. The sensor also employs a magnetic field coupling component which moves responsive to the movement of an element whose position is being monitored. The coupling component moves relative to the other two components. As a result, the degree of magnetic coupling between the moveable component and one other component is consistent and independent of the movement of the moveable component.

In a first embodiment, a sensor for determining angular position of a rotating shaft is provided. The apparatus comprises an arcuately shaped magnetic field sensor which is co-planar with a circularly shaped magnetic field generator. The coupling component located on a parallel plane above magnetic field sensor and generator has a fin portion attached to a hub which is, in turn, co-axial with the magnetic field generator. Upon rotation of the coupling component, therefore, the degree of magnetic coupling between the coupling component hub and magnetic field generator remains constant. However, the area of the fin portion directly above the arcuate sensor linearly varies during rotation. As a consequence, the mutually induced magnetic coupling between the magnetic field sensor and magnetic field generator linearly varies with respect to mechanical travel.

In another embodiment, the coupling component moves in a linear path over the magnetic field generator and sensor. The area of the coupling component directly above the magnetic field generator, in this embodiment, linearly varies when the coupling component shifts position. The orientation of the magnetic field sensor relative to the coupling component does not change and as a result, the degree of magnetic coupling remains constant. The degree of magnetic coupling between the magnetic field generator and the coupling component, therefore, linearly varies such that the magnetic field sensors will produce an electric signal that is a non-linear function of the mechanical travel of the coupling component.

In a further embodiment, two or more magnetic field sensors are arranged symmetrically on either side of a magnetic field generator and are connected in opposed series in order to provide a displacement measurement relative to a null position (i.e., when the coupling component is equally disposed over both magnetic field sensors). Both the magnetic field sensors and generator are arcuately shaped, and mutually form an arcuately shaped assembly that is parallel to the path of travel of the coupling component. The output is a linear function of movement of the coupling component.

A fourth embodiment is provided that resembles the above-described displacement device, but measures linear displacement rather than the angle of rotation.

DESCRIPTION OF THE DRAWINGS

Embodiments of the present invention are shown in the accompanying drawings, wherein.

DESCRIPTION OF THE PREFERRED EMBODIMENTS

Figure 1:
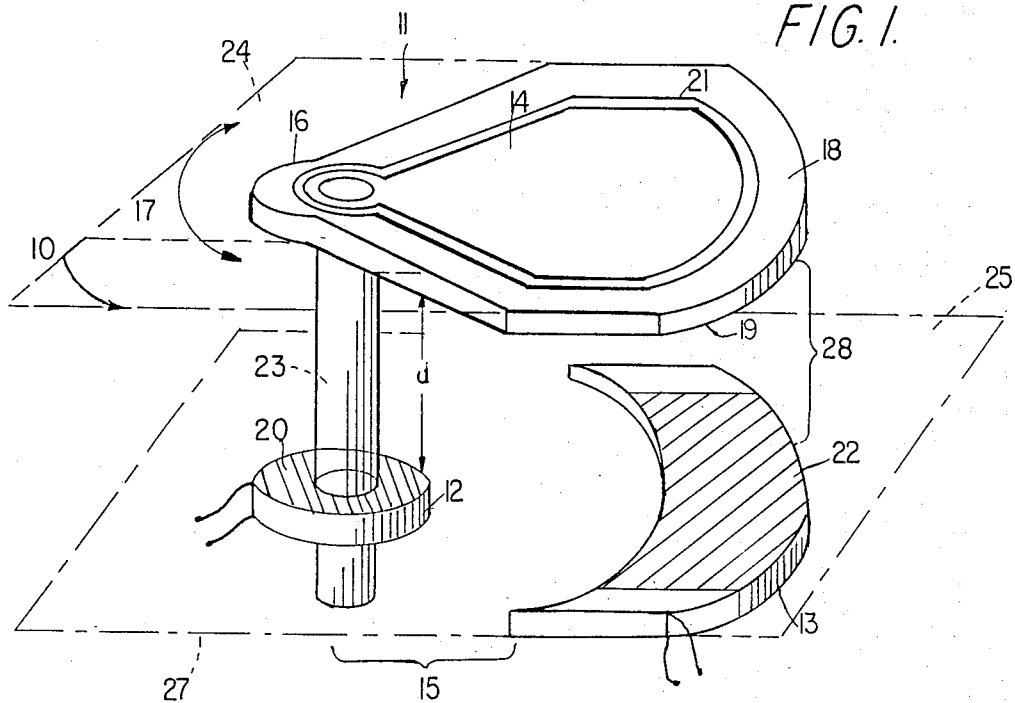
FIG. 1 is an isometric view of a first embodiment of a position sensor according to the present invention.

Referring to FIG. 1, a position sensor device 10 includes a movable assembly 11 and a stationary assembly 15. Movable assembly 11 comprises coupling component 14 fixedly attached to a shaft or any other rotating element, which transmits rotational movement from the part to be measured to coupling component 14 in the directions indicated by arrows 17. In addition, coupling component 14 comprises a single loop of conductive material 21 that is either etched on surface 19 of an appropriate substrate such that it faces stationary assembly 15 or is embedded within the substrate. The coil loop is located around the peripheries of surface 19, thereby forming a conductive path that substantially outlines the shape of coupling component 14 as well as matches the shapes of the stationary assembly components. Furthermore, coupling component 14, which lies in plane 24, is positioned at a pre-determined distance above stationary assembly 15 thereby defining an air space 28 between stationary assembly 15 and coupling component surface 9. The width of air space 28, designated by the letter d, is held constant during motion of the coupling component.

The shape of coupling component 14 comprises a circular hub portion 16 integral with an arcuate fin portion 18. The central portion of hub 16 has an aperture which is adapted to interfit with a rotatable element 23, such as a shaft or axle. Stationary assembly 15 is located in second plane 25 parallel to plane 24 and comprises magnetic field generator component 12 and magnetic field sensor component 13, which are spaced apart, and not coupled, for example, by a common core. Both magnetic field generator 12 and sensor 13 are co-extensive with coupling component 14 such that they are generally located below hub 16 and fin 18. As a result, when coupling component 14 rotates in the directions indicated by arrows 17, the projected area of coil loop 21, located around the periphery of fin 18, directly on magnetic field sensor 13 (shaded area 22), linearly varies during rotation, while the projected area of the loop passing around hub 16 on magnetic field generator 12 (shaded area 20) remains constant.

Magnetic field generator 12 can comprise either a coil which is helically wound, or a conductive loop etched along surface 20 in order to generate a magnetic flux in air space 28. Alternately, magnetic field generator 12 can be a conductive plate which, when electrified, produces sufficient eddy currents to generate a magnetic flux. Magnetic field generator 12 is connected via lines 27 to an A.C. source (not shown) such that an alternating magnetic field is generated when generator 12 is energized.

Magnetic field sensor 13 comprises an arcuately shaped plate having surface 22, upon which one or more inductive coils are either etched or helically wound. The plate can be made of an appropriate backing magnetic or core material in order to improve the inductive capabilities of the windings. The magnetic field sensor component is connected via lines 29 to a measuring device, such as a voltmeter or ammeter (not shown), which measures the induced electrical signals and provides positional measurement.

In operation, when the A.C. source is energized, magnetic field generator 12 induces a first alternating magnetic flux into air space 28 such that coupling component 14 is substantially encompassed by the magnetic field. Because the shape of magnetic field generator 12 and hub 16 are the same, and the magnetic field generator is co-axial with hub 16, the projected area 20 remains constant and independent of the angular position of component 14. Thus, the degree of magnetic coupling between generator 12 and the coupling component remain substantially constant and independent of the angular position of coupling component 14. In addition, coil loop 21 couples the magnetic flux produced by magnetic field generator 12 to sensor component 13 such that a second magnetic flux is generated that is a function of the first magnetic flux. As coupling coil loop 21 has a conductive surface either located on face 19 or generally disposed in opposed relation to stationary assembly 15, the magnetic flux generated by coupling component 14 substantially encompasses magnetic field generator 12 and sensor 13. An electric signal, thereby, is induced by magnetic field sensor 13 and conducted via lines 29 to the measuring device.

The magnitude of the transduced electric signal is dependent upon the magnitude of the first magnetic field produced by magnetic field generator component 12 and the degree of magnetic coupling between coil loop 21 and magnetic field sensor component 13. The variation in magnetic coupling, in turn, depends upon the position of coil 21 relative to the magnetic field sensor. For example, placement of the coil fully above the sensor would produce the highest degree of magnetic coupling and, consequently, the highest magnitude induced signal. Variation in the transduced signal, therefore, results from variation in the projected area of coupling coil loop 21 on magnetic field sensor 13. In addition, the shape of sensor 13 matches that of fin 18 and the coil portion located in the fin such that the sensor is substantially parallel to the path of travel of that portion of the coil. As a result, the area of the coil loop in fin 18 proximate to sensor 13 linearly changes when coupling component 14 is rotated. The sensor output, therefore, is a linear function of the rotational angle of coupling coil 14.

Figure 2:
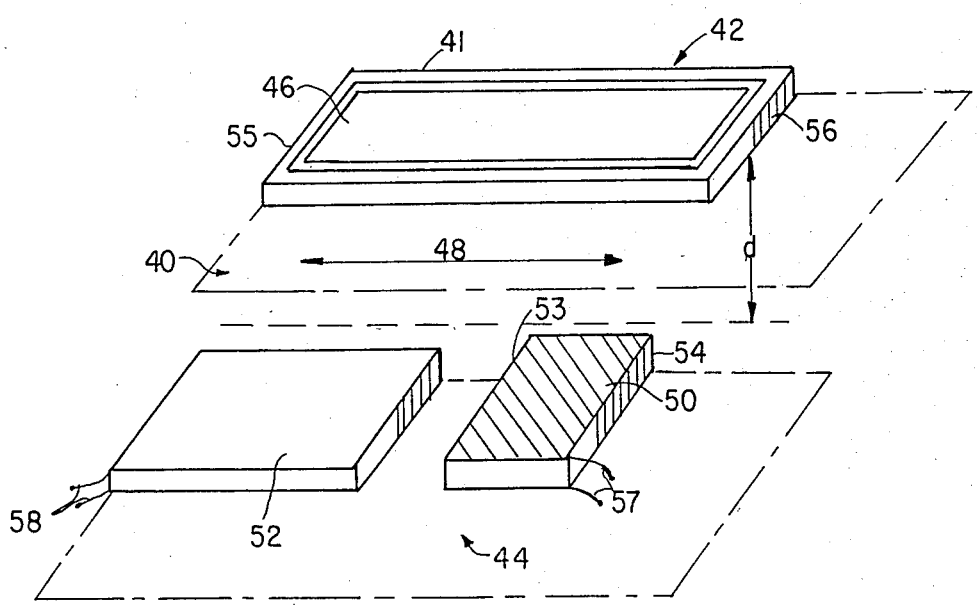
FIG. 2 is an isometric view of a position sensor formed in accordance with the present invention that measures linear position.

FIG. 2 is an isometric view of a second embodiment 40, which is oriented to measure linear changes in the position of moveable assembly 42. Composition, orientation, and interconnection of movable assembly 42 and stationary assembly 44 are similar to that of FIG. 1. Coupling component 46, however, is mechanically connected to a part that moves in a linear rather than rotational direction indicated by arrows 48. Coupling component 46 forms a rectangular plate having its longitudinal axis oriented parallel to the direction of arrows 48. The plate contains coil loop 41 which is either etched on the plate surface or is embedded within the plate. Stationary assembly 44 is located below coupling component 46 parallel to the movable component direction of travel. The stationary assembly comprises rectangularly shaped magnetic field sensor plate 50 attached via lines 57 to a measurement device (not shown) and rectangularly shaped magnetic field generator plate 52 connected via lines 58 to an A.C. source (not shown). The dimension of the stationary assembly matches that of coupling component 46. In addition, the path of travel of coupling component 46 is limited such that coupling component side 55 is located above sensor side 53 at one extreme end position, and coupling component side 56 is above sensor side 54 at the opposite end position.

When generator 52 is energized by an A.C. source, and coupling component 46 moves in the direction indicated by arrows 48, the area of the coupling coil loop 41 directly above magnetic field generator 52 linearly varies. Furthermore, as the coupling component end positions are limited to sides 53 and 54 of magnetic field sensor 50, the degree of magnetic coupling between magnetic field sensor 50 and coil loop 46 remains constant throughout the path of travel. As a result, the electrical signal induced by magnetic field sensor 50 will be a non-linear function of the change in position of coupling component 46 and, of the part to be measured.

Figure 3:
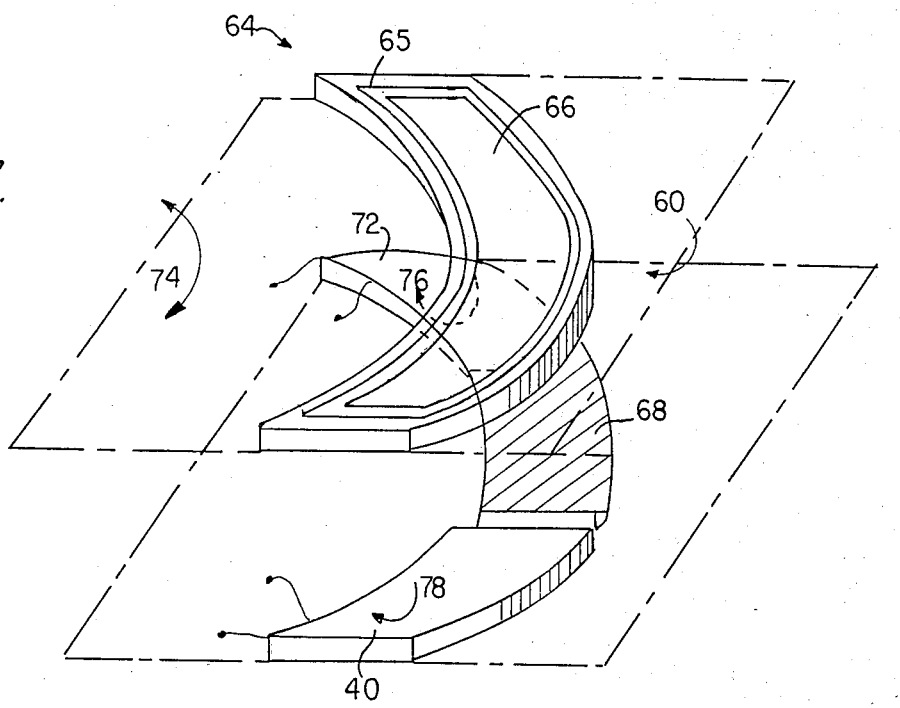
FIG. 3 is a pictorial view of a position sensor formed in accordance with the present invention that measures angular displacement from a null position.

FIG. 3 is a pictorial view of a third embodiment 60, which is oriented to provide a null position measurement when moveable assembly 64 is located at a predetermined position. The orientation of stationary assembly 62 relative to movable assembly 64, and the composition of coupling component 66, coil loop 65, magnetic field generator 68, and magnetic field sensors 70 and 72 are similar to that of FIG. 1. However, the magnetic field sensor is divided into two arcuate sensor plates 70 and 72, which are parallel to path 74 of coupling component 66. The magnetic field sensors are symmetrical on either side of the magnetic field generator 68 and are serially connected in opposition so that an alternating current induced by magnetic field sensor 70 circulates in the direction of arrow 78 and then through magnetic field sensor 72 in the direction of arrow 76. The induced flux, therefore, adds in one direction in sensor 70 and then adds in the reverse direction in sensor 72 such that positional measurement varies from a null position when the coupling coil loop 65 is equally located over both sensors to a maximum positive and/or negative displacement when coil loop 65 is located over opposite ends of sensors 70 and 72. As a result, a displacement measurement relative to a null position is transduced by the sensors.

Figure 4:
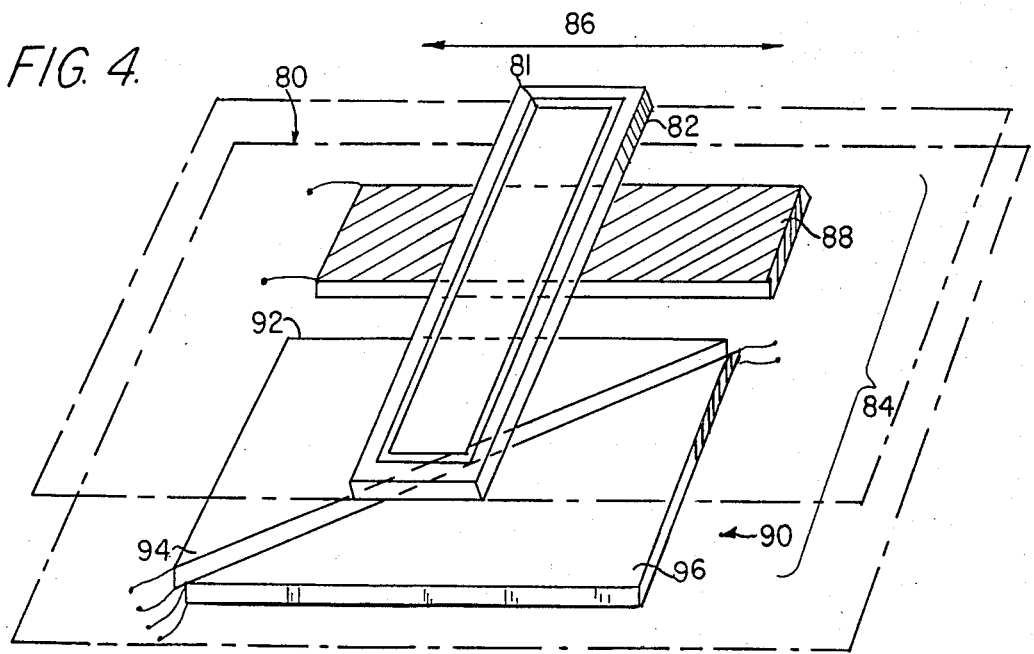
FIG. 4 is an pictorial top view of a fourth embodiment of the present invention that measures linear displacement from a null position.

FIG. 4 is a pictorial top view of the fourth embodiment 80, which operates similar to the embodiment shown in FIG. 3. Coupling component 82 is positioned above stationary assembly 84 and travels in the linear direction indicated by arrows 86, i.e., parallel to the longitudinal axis of the stationary assembly. Stationary assembly 84, comprises magnetic field generator 88, which forms a rectangle whose longitudinal axis is parallel to the path of travel of coupling component 82. Magnetic field generator 88 is located at a set distance from the longitudinal side of magnetic field sensor 90. The magnetic field sensor assembly is made of two right-triangularly shaped coil plates 94 and 96, whose hypoteneuses are adjacent and whose short sides are at opposite ends of the assembly. The magnetic field sensors, therefore, form composite rectangle 98 having a transverse space separating sensors 94 and 96.

The sensors are connected in opposed series in a manner similar to that of FIG. 3. As a result, when coil loop 81 is located over the longitudinal center of rectangle 98, the output of the circuit is zero. Displacement of coil 81 in either direction along triangles 94 and 96 will produce a displacement measurement relative to the null position.

Alternately, the sensors of FIGS. 3 and 4 can be wired to a demodulator circuit (not shown) in order to control the phase of the output signals.

It is believed that the advantages and improved results furnished by the apparatus of the present invention are apparent from the foregoing description of the preferred embodiment of the invention. Various changes and modifications may be made without departing from the spirit and scope of the invention as described in the claims that follow.

What is claimed is:

1. A magnetic position sensor for monitoring the change of position of an element in a contactless manner, said sensor comprising:
    (a) a magnetic field generator component through which a varying current flows for inducing a first varying magnetic field;
    (b) a magnetic field coupling component including an untuned coreless coil mounted to be magnetically coupled to the magnetic field generator component and to have current induced therein by said first varying magnetic field, said induced current generating a second varying magnetic field;
    (c) a magnetic field sensor component magnetically coupled to said magnetic field coupling component through said second varying magnetic field;
    (d) means for mounting the magnetic field coupling component to said element to move with said element relative to said other two components, the degree of magnetic coupling between said coupling component and the magnetic field generator component being substantially independent of the movement of said element while the degree of magnetic coupling between said coupling component and the magnetic field sensor component being a function of the movement of said element; and
    (e) means for measuring the signal induced in said magnetic field sensor component by the said second varying magnetic field for indicating the position of the element whose change in position is being monitored.

2. The apparatus of claim 1 wherein the degree of magnetic coupling between said coupling component and said magnetic field generator varies as a function of the movement of the coupling component.

3. The apparatus of claim 1 wherein the degree of magnetic coupling between said coupling component and said magnetic field sensor varies as a function of the movement of the coupling component.

4. The apparatus of claim 1 wherein said magnetic field generator component and said magnetic field sensor component are co-planar.

5. The apparatus of claim 4 wherein said coupling component comprises a single continuous loop of conductive material disposed around the periphery of said component such that said conductive loop forms a shorted coil that can generate magnetic flux when encompassed by a magnetic field.

6. The apparatus of claim 1 wherein said magnetic field generator component comprises at least one inductive coil.

7. The apparatus of claim 6 wherein said magnetic field sensor component comprises at least one inductive coil.

8. The apparatus of claim 1 wherein said magnetic field generator component comprises at least one conductive plate.

9. The apparatus of claim 8 wherein said magnetic field sensor component comprises at least one conductive plate.

10. The apparatus of claim 5 wherein said coupling component is provided with a substantially arcuate fin integrally formed to a hub, the latter of which is mounted on a rotatable shaft for co-rotation with a part to be measured.

11. The apparatus of claim 10 wherein said magnetic field sensor component forms an arcuate plate that is co-extensive with said fin, whereby rotation of said coupling component linearly varies the area of said conductive loop located above said magnetic field sensor component.

12. The apparatus of claim 11 wherein said magnetic field generator component is co-axial to said hub, whereby the conductive coil loop area located above said magnetic field generator component remains constant during rotation.

13. The apparatus of claim 12 wherein the degree of magnetic coupling between said coupling component and said magnetic field sensor component linearly varies during rotational travel of said coupling component.

14. The apparatus of claim 12 wherein the degree of magnetic coupling between said coupling component and said magnetic field generator component is constant and independent of the movement of said coupling component.

15. The apparatus of claim 5 wherein said coupling component forms a rectangularly-shaped plate mounted to move in a linear direction along with a part to be measured.

16. The apparatus of claim 15 wherein said magnetic field generator and said magnetic field sensor are located parallel to the path of travel of said coupling component such that said magnetic field generator is located below a linearly varying area of said coupling component, and said magnetic field sensor component is located below an area of said coupling component that remains constant during movement of said coupling component.

17. The apparatus of claim 16 wherein the electric signal induced by said magnetic field sensor component is a non-linear function of the change in position of said coupling component.

18. The apparatus of claim 5 wherein said coupling component is substantially arcuate and is mounted in a manner that enables said coupling component to co-rotate in conjunction with a part to be measured.

19. The apparatus of claim 18 wherein said magnetic field sensor component comprises two sensors that are arcuate and are symmetrically located on either side of an arcuately-shaped magnetic field generator component in order that the path of travel of said coupling component is parallel to said magnetic field sensor component and said magnetic field generator component.

20. The apparatus of claim 19 wherein said magnetic field sensor components are connected serially in opposition.

21. The apparatus of claim 19 wherein said magnetic field sensor components are connected to a demodulator circuit.

22. The apparatus of claim 5 wherein said magnetic field sensor component forms a composite rectangle comprising two oppositely disposed right triangular magnetic field sensors having a set distance between their hypoteneuses.

23. The apparatus of claim 22 wherein said magnetic field generator component forms a rectangular plate having a longitudinal side parallel to a longitudinal side of said composite rectangle.

24. The apparatus of claim 23 wherein said coupling component forms a rectangular plate that is mounted to travel parallel to the longitudinal axis of said magnetic field sensor component and magnetic field generator component such that the degree of magnetic coupling between said magnetic field generator and said coupling component remains constant.

25. The apparatus of claim 5 wherein said conductive loop is made from heavy gauge, low-resistance wire.

26. The apparatus of claim 7 wherein said magnetic field sensor coil and said magnetic field generator coil are single turn.

27. The apparatus of claim 7 wherein said magnetic field sensor coil and said magnetic field generator coil are multiple turn.

28. A magnetic position sensor for monitoring the change of position of an element in a contactless manner, said sensor comprising:
 (a) a magnetic field generator component through which a varying current flows for inducing a first varying magnetic field;
 (b) a magnetic field coupling component including a coreless coil mounted to be magnetically coupled to the magnetic field generator component to have current induced therein by said first varying magnetic field, said induced current generating a second varying magnetic field;
 (c) a magnetic field sensor component having a magnetic core magnetically coupled to said magnetic field coupling component through said second varying magnetic field;
 (d) means for mounting the magnetic field coupling component to said element to move with said element relative to said other two components, the degree of magnetic coupling between the coupling component and the magnetic field generator component being substantially independent of the movement of said element while the degree of magnetic coupling between said coupling element and the magnetic field sensor component being a function of the movement of said element; and
 (e) means for measuring the signal induced in said magnetic field sensor component by the said second varying magnetic field for indicating the position of the element whose change of position is being monitored.

* * * * *